(12) United States Patent
Pauley et al.

(10) Patent No.: US 8,832,224 B1
(45) Date of Patent: Sep. 9, 2014

(54) DATA TRACKING FOR PROVENANCE AND CHAIN OF CUSTODY GENERATION

(75) Inventors: Wayne Pauley, Nashua, NH (US); Mich Fisher, Natick, MA (US); Stephen Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 126 days.

(21) Appl. No.: 13/340,007

(22) Filed: Dec. 29, 2011

(51) Int. Cl.
 *H04L 29/06* (2006.01)
(52) U.S. Cl.
 USPC ........................................................ 709/217
(58) Field of Classification Search
 USPC ........................................................ 709/217
 See application file for complete search history.

(56) References Cited

U.S. PATENT DOCUMENTS

| | | | |
|---|---|---|---|
| 2006/0028689 A1* | 2/2006 | Perry et al. | 358/3.28 |
| 2012/0030187 A1* | 2/2012 | Marano et al. | 707/709 |

OTHER PUBLICATIONS

P. Mell et al., "The NIST Definition of Cloud Computing," National Institute of Standards and Technology (NIST), Special Publication 800-145, Sep. 2011, 7 pages.
U.S. Appl. No. 13/247,423, filed Sep. 28, 2011 and entitled "Method and Apparatus for Friendly Man-in-the-Middle Data Stream Inspection."

* cited by examiner

*Primary Examiner* — Jason Gee
(74) *Attorney, Agent, or Firm* — Ryan, Mason & Lewis, LLP

(57) ABSTRACT

Techniques are disclosed for tracking locations of data objects in a computing network. In one example, a method comprises the following steps. Contextual data is received. The contextual data is associated with a given data object and transmitted from one or more computing devices. The one or more computing devices created the given data object and/or accessed the given data object. At least a portion of the received contextual data is used to track one or more locations of the given data object. A chain of custody report and/or a provenance report may be generated from the one or more tracked locations of the given data object. Also, a policy can be applied.

18 Claims, 4 Drawing Sheets

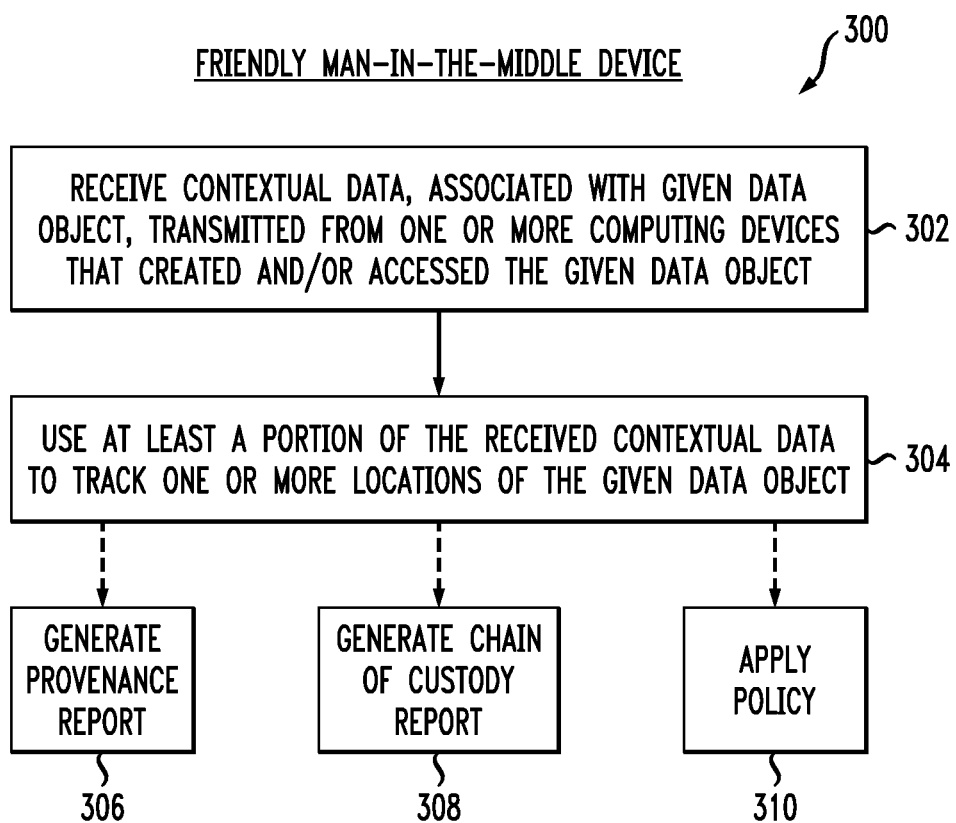

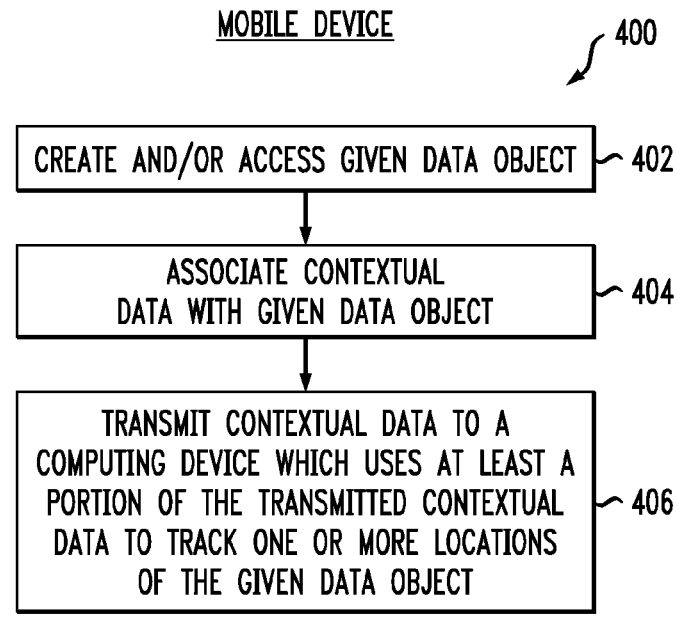
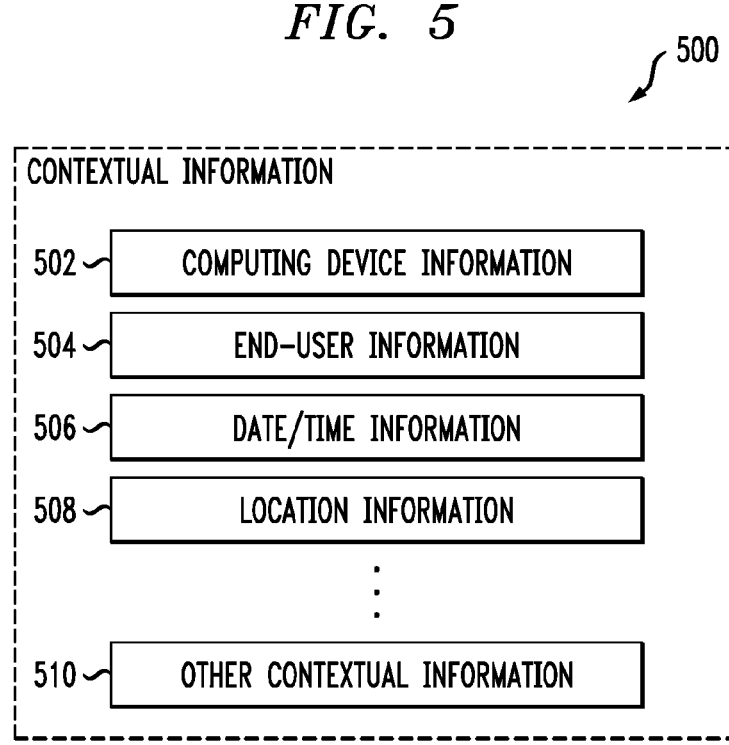

ial views.
DATA TRACKING FOR PROVENANCE AND CHAIN OF CUSTODY GENERATION

FIELD

The field relates to data management in computing networks, and more particularly to techniques for tracking locations of data objects in such computing networks.

BACKGROUND

The proper management of data in the electronic world in which we live and do business is critical for many reasons.

For example, privacy is a major concern when it comes to an individual's or a company's data. Privacy is the claim of individuals, groups or institutions to determine for themselves when, how, and to what extent information about them or in their possession is communicated to others. Private information is frequently made public or semi-public via emails, blogs and postings to social networking services, often without foresight as to the consequences of such a divulgence. Additionally, intentionally divulged information that is intended to be maintained as private is routinely sold to advertisers and information brokers. Moreover, with the proliferation of application ("app") usage in mobile devices such as smartphones, additional information is available on the "information market," including users' location, age, gender, income, ethnicity, sexual orientation and political views.

By way of another example, data that is generated on a mobile device, or otherwise stored thereon, and transmitted from the mobile device is susceptible to public divulgation. In the case of proprietary technical information, such divulgation may have intellectual property ramifications, e.g., loss of important trade secrets and/or valuable patent rights.

Thus, the ability to manage personal and/or business data is critical.

SUMMARY

Embodiments of the present invention provide techniques for tracking locations of data objects in a computing network.

In one embodiment, a method comprises the following steps. Contextual data is received. The contextual data is associated with a given data object and transmitted from one or more computing devices. The one or more computing devices created the given data object and/or accessed the given data object. At least a portion of the received contextual data is used to track one or more locations of the given data object. In one example, the received contextual data may comprise one or more of device information, end-user information, time information, date information, and location information associated with the generation or access of the given data object. In one example, the one or more computing devices may be one or more mobile devices, and wherein agent program code that resides on a given mobile device performs the associating and transmitting steps. Further, a chain of custody report may be generated from the one or more tracked locations of the given data object. Still further, a provenance report may be generated from the one or more tracked locations of the given data object. Also, a policy can be applied.

In another embodiment, a method comprises the following steps. A given data object is created and/or accessed. Contextual data is associated with the given data object. The contextual data is transmitted to a computing device which uses at least a portion of the contextual data to track one or more locations of the given data object. In one example, the computing device, that tracks the locations of the given data objects, is a friendly man-in-the-middle device.

In yet another embodiment, a computer program product is provided which comprises a processor-readable storage medium having encoded therein executable code of one or more software programs. The one or more software programs when executed by a processor of a processing device implement steps of one of the above-described methods.

In a further embodiment, an apparatus comprises a memory and a processor operatively coupled to the memory and configured to perform steps of one of the above-described method.

Advantageously, in accordance with one or more embodiments of the invention, as data objects are created and stored and transferred on mobile devices (endpoints), a trail is created for tracking the object location(s) and where copies reside. Furthermore, a forensic analysis can be executed with a formal chain of custody for specific data objects that are created by a mobile device within a network that, for example, employs a friendly man-in-the-middle device. Still further, provenance can be generated and reported on data objects coming from mobile devices and traveling to other mobile devices, and can be logged with the friendly man-in-the-middle device.

These and other features and advantages of the present invention will become more readily apparent from the accompanying drawings and the following detailed description.

BRIEF DESCRIPTION OF THE DRAWINGS

FIG. 3 shows a method implemented on the friendly man-in-the-middle device of FIG. 1 in accordance with one embodiment of the invention.

FIG. 4 shows a method implemented on one or more of the endpoint devices of FIG. 1 in accordance with one embodiment of the invention.

FIG. 5 shows contextual data in accordance with one embodiment of the invention.

DETAILED DESCRIPTION

Figure 1:
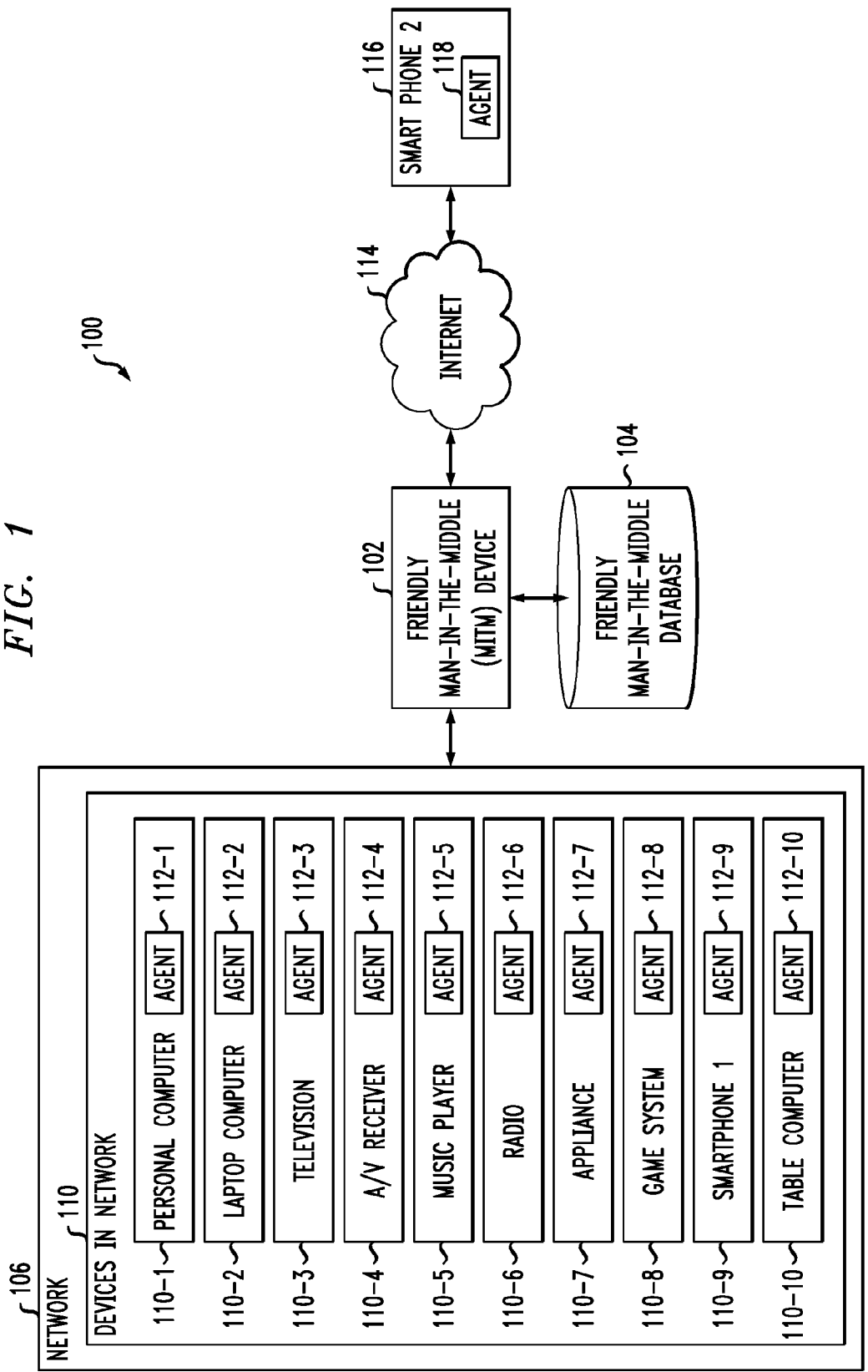
FIG. 1 shows a friendly man-in-the-middle device and endpoint devices in a network environment in accordance with one embodiment of the invention.

Embodiments of the present invention will be described herein with reference to exemplary computing networks, information processing systems, computing systems, data storage systems and associated servers, computers, storage units and devices and other processing devices. It is to be appreciated, however, that embodiments of the invention are not restricted to use with the particular illustrative network, system and device configurations shown. Moreover, the phrases "computing network," "information processing system," "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-

145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Further, as used herein, the phrase "data object" or simply "object" refers to any given data item or data unit that may be part of an information network. An object or data object may take on any form and it is to be understood that the invention is not limited to any particular form. For example, an object may be electronic data such as one or more web pages, documents, records, text messages, multimedia messages, files, images, videos, electronic mail (email), or any other type of data set, data item, or data unit. Thus, embodiments of the invention are not limited to any particular type of data object.

As used herein, the term "provenance" refers to an indication or determination of where a given data object came from, or an indication or determination of one or more data objects from which the given data object was derived. That is, the term "provenance" refers to the history or lineage of a given data object (or multiple data objects). Thus, "provenance information" or "provenance data" is information or data that provides this indication or results of such determination.

As used herein, the phrase "chain of custody" refers to a chronological documentation or trail, showing the generation, access, custody, control, transfer, analysis, and/or disposition of a data object.

It is realized that as the number of Internet-connected devices in a home and/or an enterprise (e.g., business or commercial entity) continues to rise, the concept of privacy is increasingly caught in the midst of two divergent forces: (1) an individual's, group's or institution's likely desire to maintain information as private; and (2) the increasing vulnerability of such information to a privacy breach or unintended disclosure. Internet-connected devices (endpoints) in a household/enterprise environment may include, but are not limited to, personal computers, laptop computers, televisions, audiovisual (A/V) receivers, music players, radios, appliances and game systems, smartphones and tablet computers. Some of these devices are considered mobile, while others are not. Regardless, such devices are typically considered "endpoints," "client devices," or simply "clients." While many of these devices have a method to block Internet access entirely, they lack finer-grain controls for limiting Internet access.

For example, existing methods for controlling the disclosure of private information include centralized devices that entirely block access to a particular resource by using source/destination routing filters, regardless of content that is being sent to or received from that resource. Further, while there are some endpoint-based protections that examine content, they are one-off per client, require an administrator to set up and manage each device manually, and do not protect all device types (i.e., are only available on certain platforms).

Therefore, a centralized point of control is desirable that performs an analysis of context and content of a data stream, such as, but not limited to, privacy-related portions of a data stream. Within the household, for example, a broadband router is generally a common access point for most home-based Internet-connected devices. Thus, by implementing an intelligent layer, for example, in the router (or as a standalone device), the payload of a data stream can be inspected for keywords. Then, based on the keyword inspection, a blocking, masking or modifying (data stream transformation) mechanism can be employed to protect unauthorized or potentially harmful data from escaping the household/enterprise (i.e., intentional or accidental), irrespective of source-type and in a manner transparent to the destination.

One example of such a centralized point of control that performs the above-mentioned data stream inspection and transformation is described in the pending U.S. patent application identified as Ser. No. 13/247,423, entitled "Method and Apparatus for Friendly Man-in-the-Middle Data Stream Inspection," filed on Sep. 28, 2011, which is commonly assigned herewith and incorporated by reference herein. The centralized point of control described therein is a friendly man-in-the-middle (FMITM) device.

The FMITM device described therein receives (i.e., intercepts) a data stream before the data stream escapes a subject network toward a destination device. The FMITM device is considered a "friendly" MITM device because the individuals who are the administrators (i.e., persons or parties who are managing and monitoring the data stream) are acting in the best interest of the end-users of the network (e.g., parents monitoring children, or employer monitoring employees). The FMITM performs an analysis of context (e.g., attributes relating to the data stream including, but not limited to, user, group, identity, device, service, packet header, address, date, time and protocol) and content (e.g., payload) of one or more portions of a data stream. The FMITM then forwards the portions of the data stream out of the network to the intended destination device as a transformed data stream according to the analysis.

The above-mentioned FMITM methodology may rely on devices/users within the subject network attaching to the FMITM infrastructure. However, it is realized that the proliferation of mobile devices allows a user to leave the home environment and avoid the FMITM protection and become susceptible to the privacy leakage that the FMITM system is trying to prevent. Similar concerns would be realized in a business environment where a company issues mobile phones or other mobile devices to its employees in the field.

For example, assume that a person using a mobile phone has transmitted, via a text message, an object such as an image that ends up in a legal dispute. Specific objects are thus understood to have intrinsic value to the mobile device user whether it be a privacy concern or of an intellectual property value. However, if the mobile device were not under the protection of the FMITM-based system, then there might not be control over the transmitted object to a degree that adequately addresses such privacy and/or intellectual property concerns.

Accordingly, it is realized that it would be advantageous to augment overall FMITM capability by embedding FMITM functionality for enforcement into an agent module (software program code) which runs on a mobile device or endpoint such that a chain of custody and provenance of data objects generated and/or accessed by the mobile device is ensured. That is, by embedding the agent module in the mobile device, this allows for generation of a chain of custody report and/or a provenance report. This is accomplished by tracking the data object, including location information, and forcing registration and acknowledgement for specific object types working with the FMITM-based system. For example, as will be explained and illustrated below, when a data object is registered and as it is sent on to one or more destinations (endpoints), the movement is logged at an FMITM device. Thus, the FMITM device, as will be illustratively described below, is tracking the location(s) of a given object along with the timeline so that the location(s) of the object is always known to the FMITM device, and to anyone who wishes to query the FMITM device for the information.

Also, the current holder of the object may be informed that the object has been successfully sent to the next recipient(s). The recipient can accept the given object. As such, with the sender receiving acknowledgement and acceptance of the object by the recipient(s), a current chain of custody is understood and acknowledged along the way for the given object. The information as to the timeline, locations, senders and recipients of the given object can thus be presented in a report (e.g., file, document, or other rendering, including electronic and/or hard copy). Similarly, a provenance of the given object can be reported from the same or similar information.

FIG. 1 shows a friendly man-in-the-middle (FMITM) device and endpoint devices in a network environment 100 which implement one or more FMITM functions on the endpoint devices in accordance with one embodiment of the invention.

As illustrated in FIG. 1, a FMITM device 102 is coupled between a network 106 and the Internet 114. The FMITM device 102 has a FMITM database 104 associated therewith. The network 106 (e.g., home network or enterprise network) includes one or more devices (endpoints) 110. Examples of devices 110 include, but are not limited to, personal computer 110-1, laptop computer 110-2, television 110-3, A/V receiver 110-4, music player 110-5, radio 110-6, appliance 110-7, game system 110-8, smartphone 110-9, and tablet computer 110-10. One or more of devices 110 may transmit one or more data objects intended for a device (endpoint) outside the network 106, e.g., smartphone 116. Likewise, smartphone 116 may transmit one or more data objects intended for one or more of devices 110 in the network 106.

One function of the FMITM device 102, as described above, is to inspect data streams passing there through for content that violates one or more pivacy policies. The FMITM device 102 can then either block the content or modify the content to address the privacy issue.

However, the FMITM device 102 also is configured to receive contextual data from one or more of the devices 110 and 116. Such contextual data is generated at a given one of the devices 110 and 116 when the given device either generates a data object or accesses a data object. This contextual data may be stored in FMITM database 104 and is used to track the location of a given data object. In this manner, a chain of custody report or a provenance report can be generated.

More particularly, contextual data is associated with data objects that are generated or accessed by devices 110 and/or 116. Examples of contextual data include, but are not limited to, device information, end-user information, time information, date information, and location information associated with the generation or access of the given data object. This contextual data is then transmitted to the FMITM device 102 where the contextual data is registered as being associated with the given data object. In this manner, the locations of the given data object (i.e., including the original data object and copies thereof) are tracked. A chain of custody report can be generated, as well as a provenance report for the given data object. Further, given the ability to track the given data object, one or more actions can be taken based on one or more policies stored on device 102 and/or on the endpoints 110/116. By way of example only, the FMITM device 102 may remove an instance of a data object that resides on one of the devices 110 and 116.

Note that the generation, association and transmitting of the contextual data is performed by agent program code that resides in each of the devices 110 and 116. This program code is illustrated as agent modules 112-1 through 112-10 (respectively corresponding to devices 110-1 through 110-10) and agent module 118 (corresponding to device 116).

For example, in one embodiment, a registration process is managed by an agent for a device whereby the agent tags a data object with contextual data (associates contextual data with the data object) and this contextual data is then transmitted to the FMITM device 102 where it is registered in FMITM database 104.

In this manner, a given data object can now be traced for forensic analysis and a chain of custody. A report can be generated which indicates a chronological documentation of activities (e.g., generation and/or access) of the data object. A provenance report can also be generated which indicates from which one or more data objects a given data object was derived. The FMITM device 102 performs these functions based on the data that is provided by the agents (112/118) residing on the endpoint devices (110/116) and registered with the FMITM device 102.

Thus, as data objects are created and stored and transferred on mobile endpoints, a trail is created for tracking the object location(s) and where copies reside. The trail can also include acknowledgement and acceptance of an object by a destination. This information can also be logged at the FMITM device. A forensic analysis can be executed with a formal chain of custody for specific data objects that are created by a mobile device inside or outside the FMITM network. Provenance of data objects can be established and reported for a given data object. This can indicate which one or more devices generated the data object and through which one or more devices the data object traveled (i.e., which devices accessed the data object).

Referring again to FIG. 1, an example of such contextual data tagging and registration will now be given.

Assume that device 116, "smartphone 2," takes a picture with a built-in camera. Agent 118 tags the picture with contextual data such as, but not limited to, date, time, location, phone information. The contextual data is logged via agent 118 on device 116, and is registered on the FMITM device 102 via agent 118.

Assume next that the picture is emailed from device 116 to device 110-9, "smartphone 1." Agent 112-9 tags the picture with contextual data and logs it on device 110-9. Agent 112-9 then registers this data with the FMITM device 102.

Assume next that the email received by device 110-9 is accessed by tablet computer 110-10. Contextual data is logged for the email by agent 112-10 on the tablet computer 110-10, and registered with the FITM device 102. Assume also that the picture is downloaded onto the tablet computer 110-10. Contextual data is created and registered for this instance of the picture by agent 112-10.

Now assume that device 116 (smartphone 2) tries to access the email/picture. In accordance with the FMITM functionality implemented by agent 118, picture access can be blocked by agent 118 due to a given FMITM policy.

Further, agent 112-2 on device 110-2 (laptop computer) can query the FMITM device 102 for a report of where the picture is (all locations), and where access attempts were tried, and the FMITM device 102 generates a chain of custody report showing creation, transfers, and locations.

One example of a combination of a provenance and forensic analysis is as follows. Assume a report is run on the FMITM device 102 to shows all the locations of an image tagged as "taken by John on Jun. 23, 2011, at location Boston, Mass., and texted to three other phones owned by name1, name2, and name3" Assume further that a report is run on the FMITM device 102 to show that an image was tagged as "taken by John on Aug. 3, 2011 and then sent to Alice on Aug.

7, 2011, then posted on Facebook™ on Aug. 30, 2011 on Alice's page."Using the report in the second example, the image can be removed from all the locations remotely by the FMITM device 102.

These and other examples of advantageous data object management can be realized by one of ordinary skill in the art based on the use of the FMITM-enabled agents resident on the various devices inside and outside of the network.

Although system elements 102 through 118 are shown as separate elements in FIG. 1, these elements or portions thereof may be implemented at least in part on a common processing platform. In other embodiments, one or more of the system elements 102 through 118 may each be implemented on a separate processing platform, such as the processing platform to be described below in conjunction with FIG. 2. By way of example only, the FMITM device 102 may be implemented on a first processing device of a first processing platform and the FMITM database 104 may be implemented on a second processing device of a second processing platform. The other system elements may be implemented on one or the other of these processing devices/platforms, or on one more other processing devices/platforms. It is also to be understood that a given embodiment of the network environment 100 may include multiple instances of the elements 102 through 118, although only single instances of such elements are shown in the system diagram for clarity and simplicity of illustration.

Figure 2:
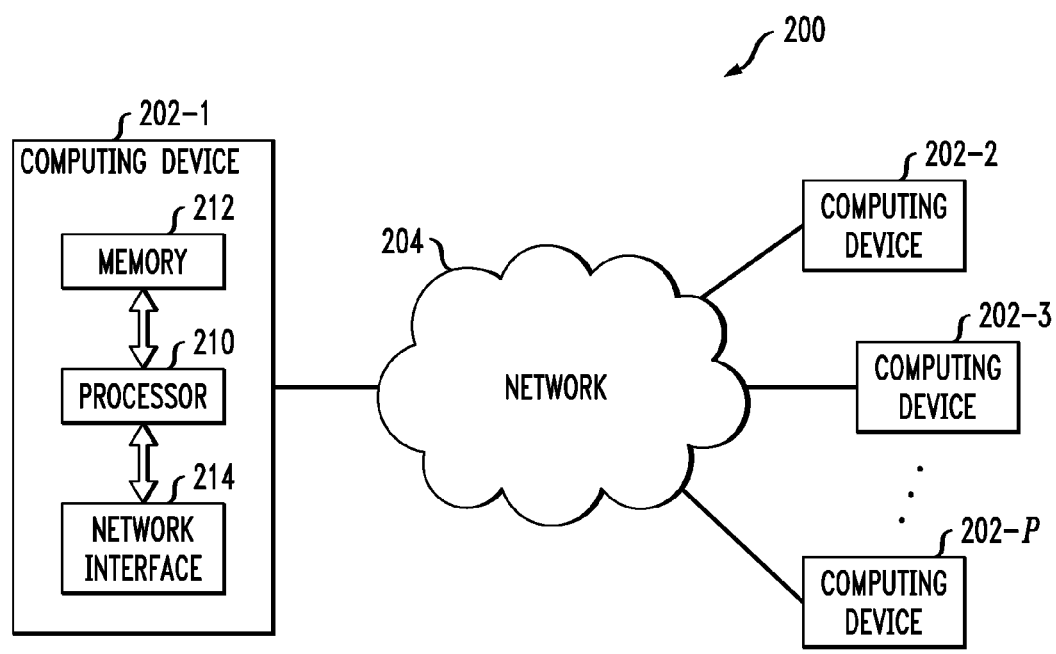
FIG. 2 shows a distributed computing platform on which the components of FIG. 1 are implemented in accordance with one embodiment of the invention.

An example of a processing platform on which the network environment 100 of FIG. 1 may be implemented is information processing platform 200 shown in FIG. 2. The processing platform 200 in this embodiment comprises at least a portion of the network environment 100 and includes a plurality of computing devices, denoted 202-1, 202-2, 202-3, ... 202-P, which communicate with one another over a network 204. One or more of the elements of network environment 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of network environment 100. Again, multiple elements or modules may be implemented by a single processing device in a given embodiment.

The computing device 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product." A computer program product comprises a processor-readable storage medium having encoded therein executable code of one or more software programs. Such a memory may comprise electronic memory such as random access memory (RAM), read-only memory (ROM) or other types of memory, in any combination. The computer program code when executed by a processing device such as the computing device 202-1 causes the device to perform functions associated with one or more of the elements of network environment 100. One skilled in the art would be readily able to implement such software given the teachings provided herein. Other examples of computer program products embodying embodiments of the invention may include, for example, optical or magnetic disks.

Also included in the computing device 202-1 is network interface circuitry 214, which is used to interface the server with the network 204 and other system components. Such circuitry may comprise conventional transceivers of a type well known in the art.

The other computing devices 202 of the processing platform 200 are assumed to be configured in a manner similar to that shown for computing device 202-1 in the figure.

The processing platform 200 shown in FIG. 2 may comprise additional known components such as batch processing systems, parallel processing systems, physical machines, virtual machines, virtual switches, storage volumes, etc. Again, the particular processing platform shown in the figure is presented by way of example only, and system 100 may include additional or alternative processing platforms, as well as numerous distinct processing platforms in any combination.

Also, numerous other arrangements of servers, computers, storage devices or other components are possible in system 200. Such components can communicate with other elements of the system 200 over any type of network, such as a wide area network (WAN), a local area network (LAN), a satellite network, a telephone or cable network, or various portions or combinations of these and other types of networks.

FIG. 3 shows a method 300 implemented on the friendly man-in-the-middle device 102 of FIG. 1 in accordance with one embodiment of the invention.

As shown, in step 302, the FMITM device 102 receives contextual data associated with a given data object. The contextual data was transmitted from one or more computing devices that generated and/or accessed the given data object. In step 304, at least a portion of this contextual data is used to track one or more locations of the given data object. From this data and tracking information, a provenance report can be generated (step 306), a chain of custody report can be generated (step 308), and/or a policy can be applied (step 310).

FIG. 4 shows a method 400 implemented on one or more of the endpoint devices 110/116 of FIG. 1 in accordance with one embodiment of the invention.

A shown, in step 402, a data object is created and/or accessed. In step 404, contextual data is associated with the data object. In step 406, the contextual data is transmitted to the FMITM device 102, where it can be used to track the data object as described in detail above.

FIG. 5 shows contextual data in accordance with one embodiment of the invention. As shown, a set 500 of contextual data that can be associated with a data object (e.g., tag the data object) and transmitted to the FMITM device (e.g., registered at or with the FMITM device) include computing device information 502, end-user information 504, date/time information 506, location information 508 and/or other contextual information 510.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising the steps of:
receiving contextual data associated with a given data object at a first device, wherein the first device is a centralized point of monitoring for one or more data streams entering or leaving a given network and the one or more data streams are associated with one or more devices in the given network, and the contextual data is received from one or more devices outside the given network that have at least one of created the given data object and accessed the given data object, wherein the contextual data is automatically associated with the given data object by agent program code resident on at least one of the one or more devices outside the given network and separate from the given data object, and the contextual data is automatically registered with the first device; and
using, at the first device, at least a portion of the received contextual data to track one or more locations of the given data object to generate at least one of provenance data and chain of custody data for the given data object such that the monitoring provided by the first device is extended to the one or more devices outside the given network;
wherein the receiving and using steps are performed by a processor coupled to a memory.

2. The method of claim 1, further comprising the step of creating a chain of custody report from the one or more tracked locations of the given data object.

3. The method of claim 1, further comprising the step of creating a provenance report from the one or more tracked locations of the given data object.

4. The method of claim 1, further comprising the step of applying a policy to at least one instance of the given data object based on the one or more tracked locations of the given data object.

5. The method of claim 4, wherein the policy comprises removing the at least one instance of the given data object from at least one of the one or more devices outside the given network.

6. The method of claim 1, wherein the contextual data received from a given one of the one or more devices outside the given network comprises one or more of device information, end-user information, time information, date information, and location information associated with the generation or access of the given data object.

7. The method of claim 1, wherein the receiving and using steps are performed by a friendly man-in-the-middle device.

8. The method of claim 1, wherein at least a portion of the one or more devices outside the given network are mobile devices.

9. A computer program product comprising a non-transitory processor-readable storage medium having encoded therein executable code of one or more software programs, wherein the one or more software programs when executed by the processor implement the steps of the method of claim 1.

10. A method comprising the steps of:
one of creating and accessing a given data object at one or more devices outside a given network;
associating contextual data with the given data object, wherein the contextual data is automatically associated with the given data object by agent program code resident on the one or more devices outside the given network and separate from the given data object; and
transmitting the contextual data from the agent program code of the one or more devices outside the given network to a first device, wherein the first device is a centralized point of monitoring for one or more data streams entering or leaving the given network and the one or more data streams are associated with one or more devices in the given network, and the contextual data is automatically registered with the first device, wherein the first device uses at least a portion of the contextual data to track one or more locations of the given data object to generate at least one of provenance data and chain of custody data for the given data object such that the monitoring provided by the first device is extended to the one or more devices outside the given network;
wherein the one of creating and accessing, associating, and transmitting steps are performed by a processor coupled to a memory.

11. The method of claim 10, wherein the one or more devices outside the given network comprise a mobile device.

12. The method of claim 10, wherein the first device which uses at least a portion of the contextual data to track one or more locations of the given data object is a friendly man-in-the-middle device.

13. A computer program product comprising a non-transitory processor-readable storage medium having encoded therein executable code of one or more software programs, wherein the one or more software programs when executed by the processor implement the steps of the method of claim 10.

14. An apparatus comprising:
a memory; and
a processor operatively coupled to the memory, forming a first device, wherein the first device is configured to: receive contextual data associated with a given data object, wherein the first device is a centralized point of monitoring for one or more data streams entering or leaving a given network and the one or more data streams are associated with one or more devices in the given network, and the contextual data is received from one or more devices outside the given network that have at least one of created the given data object and accessed the given data object, wherein the contextual data is automatically associated with the given data object by agent program code resident on at least one of the one or more devices outside the given network and separate from the given data object, and the contextual data is automatically registered with the first device; and use, at the first device, at least a portion of the received contextual data to track one or more locations of the given data object to generate at least one of provenance data and chain of custody data for the given data object such that the monitoring provided by the first device is extended to the one or more devices outside the given network.

15. The apparatus of claim 14, wherein the processor is further configured to create a chain of custody report from the one or more tracked locations of the given data object.

16. The apparatus of claim 14, wherein the processor is further configured to create a provenance report from the one or more tracked locations of the given data object.

17. An apparatus comprising:
a memory; and
a processor operatively coupled to the memory, forming a device outside a given network, wherein the device outside the given network is configured to: one of create and access a given data object; automatically associate contextual data with the given data object, wherein the contextual data is associated with the given data object by agent program code resident on the processor and separate from the given data object; and transmit the contextual data to another device, wherein the other device is a centralized point of monitoring for one or more data streams entering or leaving the given network and the one or more data streams are associated with one or more devices in the given network, and the contextual data is automatically registered with the other device, wherein the other device uses at least a portion of the contextual data to track one or more locations of the given data object to generate at least one of provenance data and chain of custody data for the given data object such that the monitoring provided by the other device is extended to the device outside the given network.

18. The apparatus of claim 17, wherein the processor and memory are part of a mobile device, and the other device which uses at least a portion of the contextual data to track one or more locations of the given data object is a friendly man-in-the-middle device.

* * * * *